US011132541B2

(12) United States Patent
Winder et al.

(10) Patent No.: US 11,132,541 B2
(45) Date of Patent: Sep. 28, 2021

(54) SYSTEMS AND METHOD FOR GENERATING EVENT TIMELINES USING HUMAN LANGUAGE TECHNOLOGY

(71) Applicant: The MITRE Corporation, McLean, VA (US)

(72) Inventors: Ransom K. Winder, McLean, VA (US); Joseph P. Jubinski, Sykesville, MD (US); Christopher Giannella, Baltimore, MD (US)

(73) Assignee: The MITRE Corporation, McLean, VA (US)

( * ) Notice: Subject to any disclaimer, the term of this patent is extended or adjusted under 35 U.S.C. 154(b) by 0 days.

(21) Appl. No.: 15/721,213

(22) Filed: Sep. 29, 2017

(65) Prior Publication Data
US 2019/0102614 A1    Apr. 4, 2019

(51) Int. Cl.
*G06F 40/279* (2020.01)
*G06F 40/30* (2020.01)
(Continued)

(52) U.S. Cl.
CPC ....... *G06K 9/00442* (2013.01); *G06F 40/295* (2020.01); *G06F 40/30* (2020.01);
(Continued)

(58) Field of Classification Search
CPC ............... G06F 17/277; G06F 17/2775; G06F 17/2785; G06F 17/27; G06F 17/271; G06F 17/2765; G06F 17/278; G06F 40/279; G06F 40/284; G06F 40/289; G06F 40/30; G06F 40/35; G06N 20/00
(Continued)

(56) References Cited

U.S. PATENT DOCUMENTS 6,212,532 B1 * 4/2001 Johnson .............. G06F 17/3071
715/236
7,840,604 B2   11/2010 Zhu et al.
(Continued)

OTHER PUBLICATIONS

Wikipedia, "Rule-based machine learning", 2 Pages, downloaded Feb. 20, 2019. (Year: 2019).*
(Continued)

*Primary Examiner* — Martin Lerner
(74) *Attorney, Agent, or Firm* — Morrison & Foerster LLP

(57) ABSTRACT

A system and method for generating event timelines by analyzing natural language texts from a textual dataset is provided. In one or more examples, the systems and methods can ingest a textual dataset and generate a visual timeline that illustrates the sequence of events contained within the textual dataset and approximately when in time each event in the textual dataset occurred. In one or more examples, machine learning classifiers can be employed to automatically extract event trigger words and time mentions in the textual dataset and anchor the extracted event trigger words to points in time expressed on the timeline. Machine learning classifiers can be employed to extract event trigger words from the textual dataset, relate the extracted event trigger words to one or more time mentions in the textual dataset, and to relate the extracted event trigger words to one or more document creation times found within the textual dataset.

30 Claims, 6 Drawing Sheets

(51) Int. Cl.
  *G06N 20/00* (2019.01)
  *G06K 9/00* (2006.01)
  *G06N 5/02* (2006.01)
  *G06F 40/42* (2020.01)
  *G06F 40/295* (2020.01)
  *G06N 7/00* (2006.01)
(52) U.S. Cl.
  CPC ............ *G06F 40/42* (2020.01); *G06N 5/022* (2013.01); *G06N 20/00* (2019.01); *G06N 7/005* (2013.01)
(58) Field of Classification Search
  USPC .............................. 704/1, 9, 10; 706/12, 55
  See application file for complete search history.

(56) References Cited

U.S. PATENT DOCUMENTS

| | | | |
|---|---|---|---|
| 8,516,374 | B2 | 8/2013 | Fleischman et al. |
| 8,751,963 | B1 | 6/2014 | Carasso et al. |
| 9,058,317 | B1* | 6/2015 | Gardner ............ G06F 17/2755 |
| 9,195,635 | B2 | 11/2015 | Liu et al. |
| 10,037,367 | B2* | 7/2018 | Kiciman ........... G06F 17/30563 |
| 2010/0145678 | A1* | 6/2010 | Csomai ............ G06F 17/2755 704/9 |
| 2010/0306141 | A1* | 12/2010 | Chidlovskii ...... G06F 17/30705 706/13 |
| 2010/0318398 | A1* | 12/2010 | Brun .................. G06F 40/289 704/9 |
| 2012/0221589 | A1 | 8/2012 | Shahar et al. |
| 2013/0132207 | A1 | 5/2013 | Ahlberg |
| 2013/0185315 | A1 | 7/2013 | Hao et al. |
| 2013/0246425 | A1 | 9/2013 | Aleksovski |
| 2013/0311481 | A1* | 11/2013 | Bhatt ................ G06F 17/30321 707/741 |
| 2014/0019119 | A1* | 1/2014 | Liu ........................ G06F 40/10 704/9 |
| 2014/0163951 | A1* | 6/2014 | Nikoulina ............. G06F 17/278 704/4 |
| 2014/0279731 | A1 | 9/2014 | Yakovenko |
| 2014/0279948 | A1* | 9/2014 | Mahate ............... G06F 17/3053 706/12 |
| 2014/0372102 | A1* | 12/2014 | Hagege ............... G06F 40/295 704/9 |
| 2015/0019513 | A1* | 1/2015 | Dey .................. G06F 17/30613 707/692 |
| 2015/0286710 | A1* | 10/2015 | Chang .............. G06F 17/30705 706/12 |
| 2015/0310130 | A1 | 10/2015 | Musuluri |
| 2015/0331937 | A1* | 11/2015 | Cardie .................... G06F 17/27 715/254 |
| 2016/0148096 | A1* | 5/2016 | Bornea ................ G06F 17/277 706/55 |
| 2016/0170997 | A1* | 6/2016 | Chandrasekaran ........................ G06F 17/3053 707/732 |
| 2016/0357770 | A1* | 12/2016 | Wu ......................... G06F 40/30 |
| 2017/0017929 | A1* | 1/2017 | Masiero ............ G06F 16/24568 |
| 2017/0069310 | A1* | 3/2017 | Hakkani-Tur ...... G06F 17/2785 |
| 2017/0262412 | A1* | 9/2017 | Liang ..................... G06F 17/21 |
| 2017/0351754 | A1* | 12/2017 | Devarakonda .......... G06F 40/30 |
| 2018/0018576 | A1* | 1/2018 | Boyer ................ G06F 17/2705 |
| 2018/0032861 | A1* | 2/2018 | Oliner ................... G06F 40/274 |
| 2018/0075020 | A1* | 3/2018 | Smyros ................ G06F 40/279 |
| 2018/0196881 | A1* | 7/2018 | Lundin ................ G06F 40/295 |
| 2018/0247221 | A1* | 8/2018 | Park ....................... G06F 17/27 |
| 2018/0267947 | A1* | 9/2018 | Miller ................... G06F 40/279 |

OTHER PUBLICATIONS

Smith, David A., (2002) "Detecting and Browsing Events in Unstructured Text," SIGIR '02 Proceedings of the 25$^{th}$ Annual International ACM SIGIR conference; 8 pages.
Srihari, Rohini, (2005) "Enabling Visualization of Event Information from Unstructured Text," abstract, SBIR—STTR America's Seed Fund, located at www.sbir.gov, visited on Dec. 15, 2017; 2 pages.
Genkin, Alexander et al., (2007) "Large-Scale Bayesian Logistic Regression for Text Categorization," American Statistical Association and the American Society for Quality Technometrics, vol. 49, No. 3; 15 pages.
Ha, Eun Young, (2010) "Modeling Discourse Structure and Temporal Event Relations for Automated Document Summarization with Markov Logic," DAI-B 72/04 Dissertation Abstracts International ISBN 9781124477633; 132 pages.
Ling, Xiao et al., (2010) "Temporal Information Extraction," Proceedings of the 24$^{th}$ Association for the Advancement of Artificial Intelligence Conference; 6 pages.
UzZaman, Naushad, (2010) "Interpreting the Temporal Aspects of Language," DAI-B 74/03(E) Dissertation Abstracts International ISBN 9781267720900; 221 pages.
Raghavan, Preethi, (2014) "Medical Event Timeline Generation From Clinical Narratives," DAI-B 76/05(E) Dissertation Abstracts International ISBN 9781321476903; 213 pages.
Etiene, Tiago et al. (2015) "Linea: Building Timelines From Unstructured Text," Brazilian Symposium of Computer Graphic and Image Processing; 8 pages.
Fulda, Johanna et al. (2015) "TimeLineCurator: Interactive Authoring of Visual Timelines from Unstructured Text," IEEE Transactions on Visualization and Computer Graphics, vol. 22, Issue 1; 10 pages.

* cited by examiner

From: http://www.bbc.com/news/world-asia-india-27481670, on May 20 2014

Narendra Modi will take the oath as India's new prime minister on 26 May, his BJP party has announced. *participant*

On Tuesday, he met President Pranab Mukherjee and formally claimed his right to form the government after his party's landslide win in the election. *participant*

Earlier, BJP MPs elected Mr Modi the leader of the parliamentary party.

In a very emotional speech to them, Mr Modi fought back tears and promised to lead a government dedicated to the poor and to young people. *location*

On arrival at the parliament house to attend the meeting with the newly-elected BJP MPs and their allies, Mr Modi bowed and kissed the steps of the building. *participant*

FIG. 1

SYSTEMS AND METHOD FOR GENERATING EVENT TIMELINES USING HUMAN LANGUAGE TECHNOLOGY

FIELD OF THE DISCLOSURE

This disclosure relates to systems and methods for generating event timelines by analyzing natural language texts from a plurality of documents and performing automated event extraction. These systems and methods can employ a pipeline of analytics to recognize times in texts, ground the times to timelines, and associate times to textual snippets representing events.

BACKGROUND OF THE DISCLOSURE

As the memory storage capacities and processing speeds of computers are continually increasing, they can be utilized to analyze large data sets to extract out information that may be interesting to a user of the computing system. In other words, a user can supply a large data set to a computer, and the processing capabilities of the computer can be utilized to extract out information that can the user may find useful.

A prime example of the use of computer to analyze data and extract features from the data is the field of human language technology (HLT). Human language technology can include the use of computers to conduct natural language processing on large textual datasets so as to extract features or knowledge from the analyzed text. As an example, human language technology capabilities can be used to conduct word and topic spotting within a textual dataset. In another example, human language technology can be used to extract entities and/or links, from both text and speech. Given that human speech and language are so varied and complex, and that often textual datasets are so vast and voluminous, human language technologies can be employed to provide computationally efficient solutions to large analytic problems.

Traditionally, HLT analytics focus on extracting entities and relationships from natural language contained within text. Text can be analyzed to determine the specific entities within speech (who, what, where, when, how) and their relationships to one another (e.g., who went where).

However, there has been a long felt need by analysts to extracts facts from data. Facts can be represented as events on a timeline, and thus the ability to analyze large textual datasets to extract out facts that can be placed on a timeline can lead to a different way of accumulating and depicting knowledge from large textual datasets.

SUMMARY OF THE DISCLOSURE

Accordingly, systems and methods for generating and building timelines of events from large textual datasets using human language technology are provided. In one example, the system can receive a textual data set, extract one or more time mentions from the received data set, and anchor the time mentions to a timeline using a model that can be created using trained machine learning classifiers to build a model upon which the anchoring of the time mentions to a timeline can be based upon. Once the time mentions have been extracted from the dataset, and the time mentions have been anchored to the timeline, the timeline can be visualized.

The systems and methods described above can be used by analysts to analyze large sets of textual data to create timelines that illustrate various events that occur within the text, and their relationships in time to one another. In this way, when applied in a decision support system, where analysts explore evidence and make decisions based on large-scale data, a manageable and navigable visualization can assist in ontology and analytic development by allowing discovery of what is effectively extracted and co-occurrence of event types. A system that extracts facts out of textual data using timelines also has the potential to make massive data far more accessible, which can be necessary given the need to interrogate the results to find errors and uncover inferable knowledge.

The systems and methods described above and through the specification can be targeted to align to a decision support system, where analysts need to explore evidence and make decisions based on large-scale data. In particular the emphasis on timeline and events more naturally dovetails with how analysts typically investigate and can be strongly differentiated from the traditional HLT approach centered on documents and entities as the core elements or with topic detection to find common threads in a corpus.

BRIEF DESCRIPTION OF THE DRAWINGS

FIG. 1 illustrates an exemplary entity based extraction of information from textual datasets according to examples of the disclosure.

DETAILED DESCRIPTION

Figure 2:
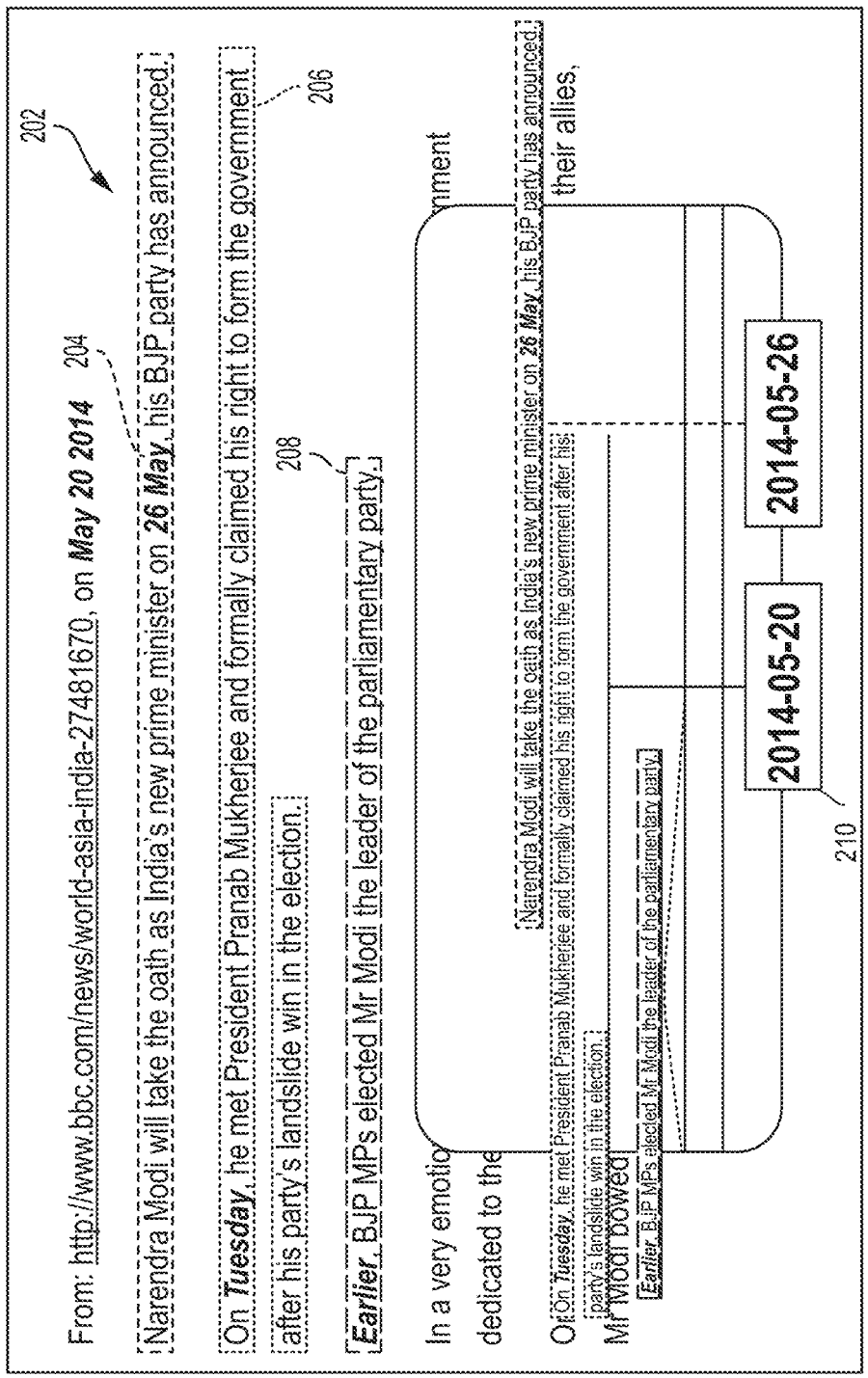
FIG. 2 illustrates an exemplary timeline based extraction of information from textual datasets according to examples of the disclosure.

In the following description of the disclosure and embodiments, reference is made to the accompanying drawings in which are shown, by way of illustration, specific embodiments that can be practiced. It is to be understood that other embodiments and examples can be practiced, and changes can be made without departing from the scope of the disclosure.

In addition, it is also to be understood that the singular forms "a," "an," and "the" used in the following description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes," "including," "comprises," and/or "comprising," when used herein, specify the presence of stated features, integers, steps, operations, elements, components, and/or units, but do not preclude the presence or addition of one or more other features, integers, steps, operations, elements, components, units, and/or groups thereof.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic, or optical signals capable of being stored, transferred, combined, compared, and otherwise manipulated. It is convenient at times, principally for reasons of common usage, to refer to these signals as bits, values, elements, symbols, characters, terms, numbers, or the like. Furthermore, it is also convenient at times to refer to certain arrangements of steps requiring physical manipulations of physical quantities as modules or code devices without loss of generality.

However, all of these and similar terms are to be associated with the appropriate physical quantities and are merely convenient labels applied to these quantities. Unless specifically stated otherwise as apparent from the following discussion, it is appreciated that, throughout the description, discussions utilizing terms such as "processing," "computing," "calculating," "determining," "displaying," or the like, refer to the action and processes of a computer system, or similar electronic computing device, that manipulates and transforms data represented as physical (electronic) quantities within the computer system memories or registers or other such information storage, transmission, or display devices.

Certain aspects of the present invention include process steps and instructions described herein in the form of an algorithm. It should be noted that the process steps and instructions of the present invention could be embodied in software, firmware, or hardware, and, when embodied in software, could be downloaded to reside on and be operated from different platforms used by a variety of operating systems.

The present invention also relates to a device for performing the operations herein. This device may be specially constructed for the required purposes, or it may comprise a general-purpose computer selectively activated or reconfigured by a computer program stored in the computer. Such a computer program may be stored in a non-transitory, computer-readable storage medium, such as, but not limited to, any type of disk, including floppy disks, optical disks, CD-ROMs, magnetic-optical disks, read-only memories (ROMs), random access memories (RAMs), EPROMs, EEPROMs, magnetic or optical cards, application-specific integrated circuits (ASICs), or any type of media suitable for storing electronic instructions and each coupled to a computer system bus. Furthermore, the computers referred to in the specification may include a single processor or may be architectures employing multiple processor designs for increased computing capability.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein.

Described herein are systems and methods for analyzing textual datasets to extract facts that can be represented as events on a timeline and further visualized using a timeline. In one example, the system provides a user the ability to analyze large textual datasets and extract the time mentions from the text. The time mentions can then be anchored to a timeline. Once the time mentions have been anchored to a timeline, the system can then perform the necessary actions to relate the textual dataset to a time on the timeline by identifying and extracting events and establishing the event relationships to time. The process of relating the textual dataset to a time on the timeline can be achieved by using a machine learning classifier that can be created using a training procedure. The training procedure can involve building a machine learning classifier using training samples that can then be used to relate text to time based on whether an event trigger appears in a sentence, or whether a sentence does not have an accompanying event in the sentence. Finally, once the textual dataset has been completely analyzed, the results can be stored in a file that can then be used to generate a visualization of the timeline. In this way, an analyst can rapidly analyze a large body of text and distill into an easy to read timeline that can aid the analysts in extracting key facts from the large body of text.

Traditionally, systems and methods used to analyze large textual datasets for key information involved extracting information about entities and relationships within a textual dataset. FIG. 1 illustrates an exemplary entity based extraction of information from textual datasets according to examples of the disclosure. As illustrated in FIG. 1, a text based document 102 can be analyzed and extracted to determine a plurality of participants 104 and locations 106 relating to the textual document. Thus in the example of FIG. 1, the text can be analyzed and such participants such as "Pranab Mukherjee," "Narendra Modi," and "BJP MPs" can be identified. Furthermore, locations such as the "parliament house" can also be identified, and the relationship between the participants and the locations extracted can be extracted (i.e., Narendra Modi met with BJP MPS at the parliament house).

While traditional models can help to quickly analyze text for important information, often times analysts are not just concerned with learning about entities and relationships contained within the text, but can also be interested in aggregating facts. Furthermore, entity and relationship extraction methods can be error prone mainly because machines are not reading text, but rather building statistical models of data and making observations on the statistic models. If the statistical models contain any errors, these errors can be propagated as more of the document or documents is analyzed. One way that facts can be aggregated is through the use of timelines. By anchoring the sentences within a textual dataset to times expressed on a timeline, an analyst can be provided with a powerful tool to help distill large textual datasets into facts that can be easily understood and visualized. Time can be more easily identified within a document than entities and relationships, and thus errors in analysis can be reduced as compared to entity and relationship based analysis.

FIG. 2 illustrates an exemplary timeline based extraction of information from textual datasets according to examples of the disclosure. The example of FIG. 2 involves the same textual dataset as was discussed above with respect to FIG. 1, however this time rather than analyze the dataset with respect to entities and the relationships between entities, instead the dataset can be distilled into a timeline. In the example of FIG. 2, each sentence of the document 202 can be analyzed to determine if a time is mentioned in the sentence. Thus, in the first sentence 204, the system and method can extract out that the events described in the sentence will take place on May 26, 2014. In the second sentence 206, the system and method can extract out that on the Tuesday prior to the $26^{th}$ of May, Narendra Modi met with Pranab Mukherjee. Finally in the third sentence 208, the system and method can determine that prior to the Tuesday before May $26^{th}$ BJP MPs elected Mr. Modi the leader of the parliamentary party.

After the sentences 204, 206, and 208 have been parsed, the system and method can then generate a timeline 210 that anchors each sentence into an event on a timeline. Thus in the example of FIG. 2, the system and method can anchor sentence 204 to the date May 26, 2014, the sentence 206 to the date May 20, 2014, and the third sentence 208 to a time before May 20, 2014.

The example of FIG. 2 can seem relatively simple when it is being applied to a single textual document. However, in a textual dataset that can contain millions of documents, such timeline extraction can be impossible to achieve using merely a human analysis. Computers can be used to help facilitate the processing of large documents, however the system and methods described above may need to be adapted so as to make the computational processing of the documents described above more efficient and feasible.

For instance, in one more examples, each and every document can be put through an algorithm that can identify key words in a sentence to facilitate the timeline extraction process. However, such algorithms can be computationally expensive, burdensome, and may even not be feasible due to the large amount of time it can take to run a sentence through a plurality of algorithms that may need to be programmed to extract out each and every possible time mention within a sentence and anchor the time mention to the timeline.

Rather than develop static algorithms to parse the text, in order to make the system more computationally efficient (i.e., faster) and robust, machine learning can be utilized to analyze the large textual datasets. Machine learning can be utilized to make data-driven predictions or decisions through building a model from sample inputs. Machine learning can be employed in computing tasks where designing and programming explicitly algorithms with good performance is difficult or infeasible (such as generating timelines as described above).

With respect to generating timelines based on anchoring time mentions to a timeline, explicitly programming algorithms that can identify each and every time mention in a language such as English can be cumbersome and infeasible. For instance, within the English language, the phrase "last Tuesday" can be vague or ambiguous. An algorithm would have to figure out first what point in time the "last Tuesday" remark is referring to (i.e., is it from the time the document was created, or from an earlier sentence). Precisely defining algorithms that can robustly determine how to anchor time mentions to a timeline can be impossible, or at the very least can require that thousands upon thousands of lines of code need to be run on each and every sentence within a textual dataset to ensure a correct and robust visualization of the facts expressed in a timeline. Such computation may take too long to make such a tool effective and useful to an analyst.

Utilizing machine learning can be computationally more efficient since a model can be created using training samples (as described below), and the model can then be utilized to extract time mentions and anchor time mentions to a timeline.

Figure 3:
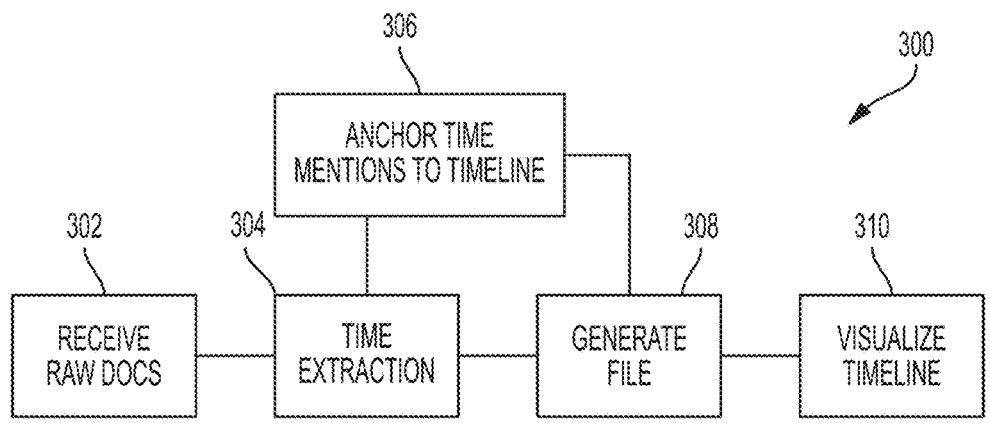
FIG. 3 illustrates an exemplary method for implementing a timeline based extraction from a textual dataset according to examples of the disclosure.

FIG. 3 illustrates an exemplary method for implementing a timeline based extraction from a textual dataset according to examples of the disclosure. The method 300 can begin at step 302 wherein a raw textual dataset is received. The raw textual dataset can be documents received from multiple sources such as websites, Facebook posts, Twitter, etc., that has been converted into plain text for the content only. Thus in the example of a website, the raw dataset can be the content of the website, with any unnecessary features extracted out. For example, a website may contain images and video in addition to the textual content of the website. The website can be converted into plain text by stripping away any video or images in the content.

In one or more examples an external decomposer software can be applied to the dataset to strip away all parts of the content that do not relate to text. In one or more examples, an external decomposer can use markers that are embedded in a webpage to identify textual content and convert it into plain text. As an example, if a piece of web content uses standard generalized markup language (SGML) or hypertext markup language (HTML) to generate web content, the tags embedded in the code of the web content can be used to identify textual content, and convert that textual content into plain text for use by the method.

Once the content has all been converted into plain text, the process can then move to step 304 wherein time entities can be extracted from the plain text files. Time entities can refer to specific dates and/or times mentioned in the text. What can be classified as a time entity can be determined by the resolution of the timeline. In one or more examples, the resolution can be maintained as a single day. Thus May $26^{th}$ at 2 pm and May $26^{th}$ at 3 pm can be classified as occurring at the same time entity (i.e., May $26^{th}$).

In one or more examples of the disclosure, each sentence of the textual dataset can be analyzed to determine if the sentence contains a time mention. The time mentions can be extracted from sentences using external software that is configured to parse sentences and/or words in a textual dataset to determine if the word or sentence contains a time mention, and then can convert the time mention in a standardized format. In other words, while the time mentions may be expressed in the textual dataset in a plurality of ways, the time extraction that occurs in step 304 may normalize all of the time mentions encountered in the textual dataset to a standardized format.

In one or more examples, time entity extraction can be performed using standardized software such as SUTime™ or HeidelTime™. SUTime is a library that recognize and normalize time expressions. As an example, SUTime can convert a phrase such as "next Wednesday at 3 pm" to a normalized time expression such as 2016-02-17 (indicating Feb. 17, 2016). Since the resolution has been kept to a day, the 3 pm can be ignored since all that matters is what day an event occurred on. HeidelTime can operate in substantially the same manner as SUTime. HeidelTime can convert temporal expressions from documents and normalize them according a specific annotation standard. In one example, either SUTime of HeidelTime can convert textual temporal expressions into the TIMEX3 annotation standard.

In one or more examples, the time extraction taking place at step 304 can also include normalizing timelines which can mean taking times that are ambiguous and relating them to a specific date. Examples of an ambiguous time mention can include "last Monday," "last week," "last Easter," etc. The process of normalization can include converting any ambiguous time mentions in a textual dataset to specific dates in a timeline. For instance, "last Monday" can be normalized to Apr. 10, 2017. The resolution of ambiguous time mentions can be done through external software such as SUTime or HeidelTime, under the assumption that the anchor being compared against is the document creation time.

As an example of the above concept, suppose an email was generated on Aug. 28, 2017, and within body of the email the following sentence appears: "Last Wednesday, I went out to eat with my friend." The term "last Wednesday" is a time mention that can be identified at step 304, however the ambiguity of the time mention may need to be resolved because on its face the "last Wednesday" can be ambiguous. However, by comparing the ambiguity to the date that the document was created, the ambiguity of an ambiguous time mention can be resolved. Thus "last Wednesday" mentioned in an email that was created on Aug. 28, 2017, can be resolved by normalizing the ambiguous time mention to Aug. 23, 2017 based on the date that the document was created.

The times extracted in step 304 can be written to an external file at 308 for further processing (described below). In one or more examples, the identified time mentions can be written in whatever temporal expression (for example TIMEX3) was selected in step 304 to normalize the time mentions extracted out of the textual dataset. In one or more examples, the time mentions extracted in step 304 can be written at step 308 into a JavaScript Object Notation (JSON) file. JSON, as is known in the art, is an open-standard file format that uses human-readable text to transmit data objects consisting of attribute-value pairs and array data types. As will be discussed below in further detail, a file format such as provided by JSON can provide a convenient format that a visualization tool can use to create a timeline.

In other examples, the file format used to generate the file at step 308 can also include Extensible Markup language (XML), Yet Another Markup Language (YAML), or any file format that may be suitable to a visualization software which can ingest the file and create a timeline visualization of the data stored in the file. A more detailed discussion of the file format generated at step 308, and how the file format is used to generate a visualization is provided below.

The time entities extracted in step 304 can be placed on a timeline and represent the points on a timeline by which all events determined in a text are anchored to. However, the process of time extraction described above with respect to step 304 may only extract out time mentions within the textual dataset and may not provide any information with respect to what events occurred with respect to the extracted out time mentions. Thus, at step 304, the analyst may only be left with the knowledge of what time mentions appear in the textual dataset, but would still not have knowledge about what events occurred on, before, or after the time mention. In order to gather that information, the process can move to step 306 wherein the time mentions and their associated events can be anchored to the timeline.

In step 304, the words in a textual dataset can be parsed to extract out any time mentions and at step 308, write those time mentions into a data file. At step 306, the textual dataset can be analyzed to anchor event trigger words in the textual dataset to the extracted time mentions. To better understand the role that a time mention and an event trigger can play in a sentence, the following sample sentences are provided below:

1. "I went to the grocery store last Saturday."
2. "John and Jane were married on Mar. 6, 2014."
3. "A couple of weeks ago, I went on vacation."

Using the above examples, at step 304, the time mentions can be extracted. Thus for the first sentence "last Saturday" can be extracted as a time mention. For the second sentence "Mar. 6, 2014" can be extracted as a time mention. For the third sentence, "a couple of weeks ago" can be extracted as a time mention.

Figure 4:
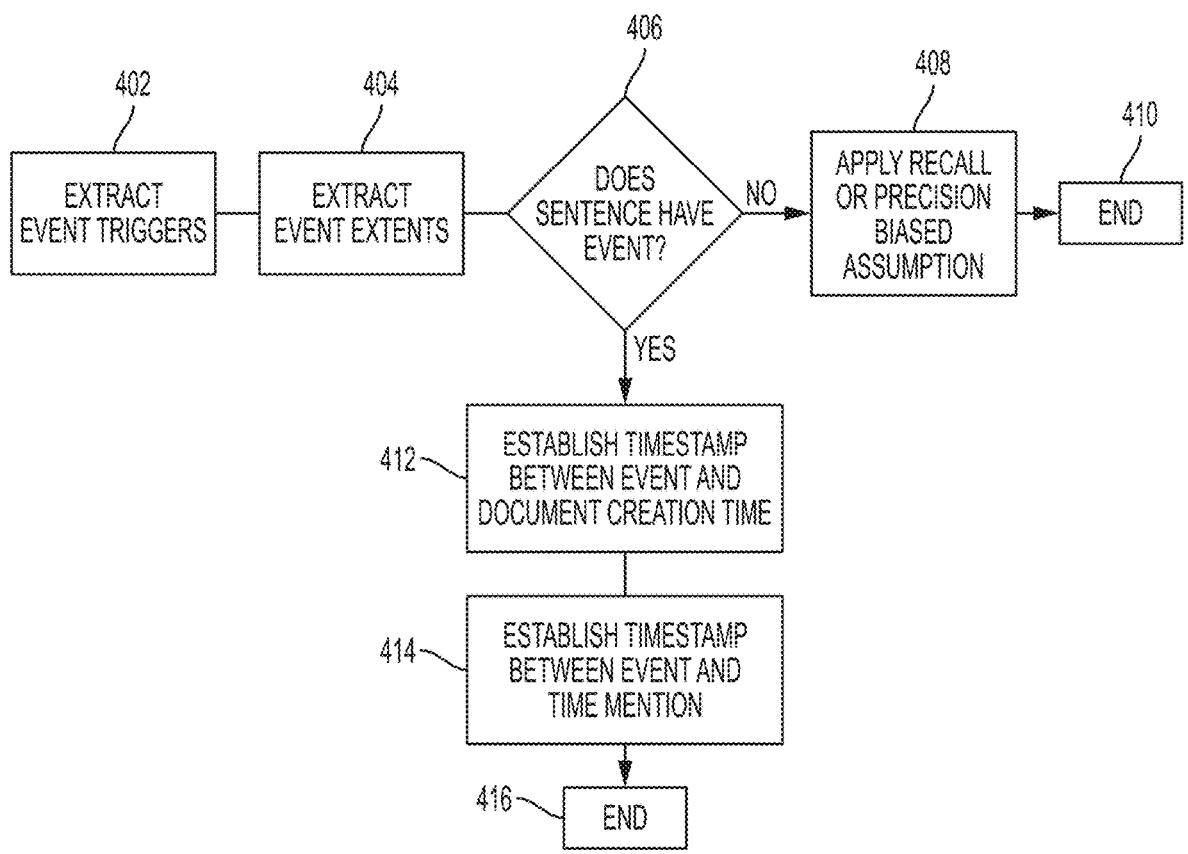
FIG. 4 illustrates an exemplary method for anchoring time mentions to a timeline according to examples of the disclosure.

At step 308, the sentences can be again examined to determine events within the sentences and relate events to the time mentions within each sentence. FIG. 4 illustrates an exemplary method for anchoring time mentions to a timeline according to examples of the disclosure. The example of FIG. 4 can represent an expanded explanation of step 308 discussed above with respect to the embodiment of FIG. 3. The method 400 can begin at step 402, wherein one or more event triggers can be extracted from the textual dataset. An event trigger can include one or more words that indicate that some event is occurring within a sentence. Referring back to the example sentences provided above, in the first sentence "went to the grocery store" can be identified as an event. In the second sentence "were married" can be identified as an event. In the third sentence "went on vacation" can be identified as an event.

As discussed above, generating and running an algorithm that can parse a textual dataset and identify event triggers can be computationally infeasible and cumbersome. Using English as an example, the language has a vast array of words that can be considered "an event." First, it can be a burdensome task to try and derive a static algorithm that can incorporate every situation in the English language that may indicate an event occurring within a sentence. Second, even if such an algorithm were to be created, it would take a long amount of time to implement such an algorithm on each and every word within a textual dataset. Rather as described above, machine learning can be employed to train a machine learning classifier that can create a model to identify event trigger words within a textual dataset.

Figure 5:
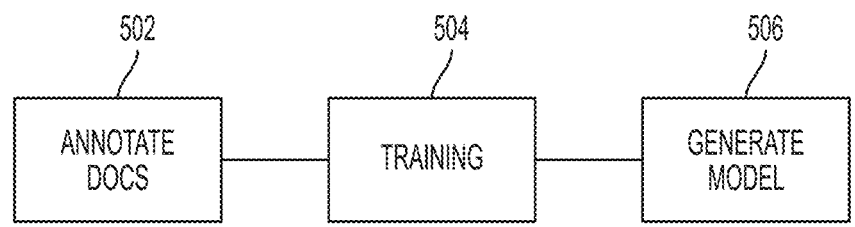
FIG. 5 illustrates an exemplary process for generating a machine learning model according to examples of the disclosure.

FIG. 5 illustrates an exemplary process for generating a machine learning model according to examples of the disclosure. The method 500 describes that process that can employed to train a machine learning classifier so as to generate a machine learning model. In the example of FIG. 5, the method 500 can begin at step 502 wherein one or more training documents used to teach the machine learning classifier are provided. The training documents can be used to support a supervised learning scheme. Supervised learning can refer to the machine learning task of inferring a function from labeled training data. The training data can consist of a plurality of training examples that can be used to teach the machine learning classifier to identify or classify certain events based on past examples provided to the machine learning classifier via the training examples.

The training examples can include one or more annotated documents. An annotated document can include a document that contains sample plain text in which specific features of the document are explicitly pointed out (i.e., annotated). The code example provided below can illustrate the concept of an annotated document.

Temporal Expression Identification and Normalization
<TIMEX3 functionInDocument="CREATION_TIME" tid="t1" value="2012-05-02"/>
The car of Mayor Dixon was stolen <TIMEX3 tid="t2" value="2012-05-01"> yesterday</TIMEX3> from the driveway of her home in West Baltimore. The car was recovered in an abandoned lot not far away. The mayor could not be reached for comment."

Event Word Identification
The car of Mayor Dixon was <EVENT eid="e1">stolen</EVENT><TIMEX3 tid="t2" value="2012-05-01">yesterday</TIMEX3> from the driveway of her home in West Baltimore. The car was <EVENT eid="e2">recovered</EVENT> in an abandoned lot not far away. The mayor could not be <EVENT eid="e3" polarity="neg">reached</EVENT> for comment."

Temporal Relation Classification
<TLINK eventInstanceID="e1" relType="OVERLAP" relatedToTime="t2"/>
<TLINK eventInstanceID="e1" relType="BEFORE" relatedToEventInstance="e2"/>
<TLINK eventInstanceID="e2" relType="BEFORE" relatedToEventInstance="e3"/>

The first part of the sample annotated document example provided above can relate to annotations that help teach a machine learning classifier to identify and normalize temporal expressions. In the example above, the first line <TIMEX3 functionInDocument="CREATION_TIME" tid="t1" value="2012-05-02"/> can identify the time format (i.e., TimeX3) and also point out the creation date of the document (i.e., May 2, 2012). The above annotation can also label the document creation date as "t1." With the time format and the creation date of the document established by the training sample, the next line of the annotated document can include the sample sentence "the car of Mayor Dixon was stolen yesterday from the driveway of her home in West Baltimore." The example sentence above can be annotated as shown above. The word "yesterday" can be annotated to show that "yesterday" can be associated with May 1, 2012 using the following line of code: <TIMEX3 tid="t2" value="2012-05-01">yesterday</TIMEX3>. The word yesterday can be keyed off of the document creation date identified above thereby teaching the machine learning classifier that the word yesterday can mean one day prior to the creation date of the document. Furthermore the time event of "yesterday" can be labeled in the annotated document as t2.

Annotated documents can also be used to teach the machine learning classifier to identify event triggers within a sentence. As discussed above an event trigger can describe a word or series of words within a sentence that indicate an event has occurred. Using the example annotated document above, the sentence "The car of Mayor Dixon was stolen yesterday from the driveway of her home in West Baltimore," can be tagged (i.e., annotated) to specifically identify a word or words in the sentence that indicate that an event has occurred. In this case, the word "stolen" can be annotated to teach the machine learning classifier that the word is indicative of an event by supplying the following annotation: The car of Mayor Dixon was <EVENT eid="e1">stolen</EVENT>. The annotation can not only identify that the word stolen corresponds to an event, it can also apply a label "e1" to the event.

Each and every sentence in the annotated document can be annotated as described above. Finally, the temporal relationship classification can applied to the entire annotated document. The temporal relationship classification can teach a machine learning classifier the specific temporal relations between events and time, as well as between various events. For instance the line <TLINK eventInstanceID="e1" relType="OVERLAP" relatedToTime="t2"/> can teach the machine learning classifier that the event "e1" occurs at the same time or overlaps with the time mention t2. In other words the car was stolen on May 1, 2012. The line <TLINK eventInstanceID="e1" relType="BEFORE" relatedToEventInstance="e2"/> can indicate that the event e1 occurred before the event e2. In other words the car was stolen before it was recovered (which to a human observer would be obvious, but a fact which must be taught to a computer). Finally, the line <TLINK eventInstanceID="e2" relType="BEFORE" relatedToEventInstance="e3"/> can indicate that the event e2 occurred before the event e3. In other words the car was recovered before there was an attempt to reach the mayor.

Returning back to the example of FIG. 5, once the annotated documents have been generated at step 502 as described above, the process 500 can move to step 504 wherein the annotated documents are used to train the machine learning classifier. In one or more examples, annotated data can be used to train a Laplace-prior, Logistic Regression machine learning classifier to produce a model. The prior variance parameter of the Laplace-prior Logistic Regression machine learning classifier can be selected from the set $\{\sqrt{1/10^{(i-4)}}:i=0,1,2,3,4,5,6\}$ as expressed in the paper "Large-Scale Bayesian Logistic Regression for Text Categorization" by Alexander Genkin and David Lewis. The training of different machine learning classifiers is discussed in more detail further below. Once the machine learning classifier has been trained, the process 500 can move to step 506 wherein a model is generated that can be used to compare text being analyzed so as to classify the text into one or more categories (described in further detail below).

Figure 6:
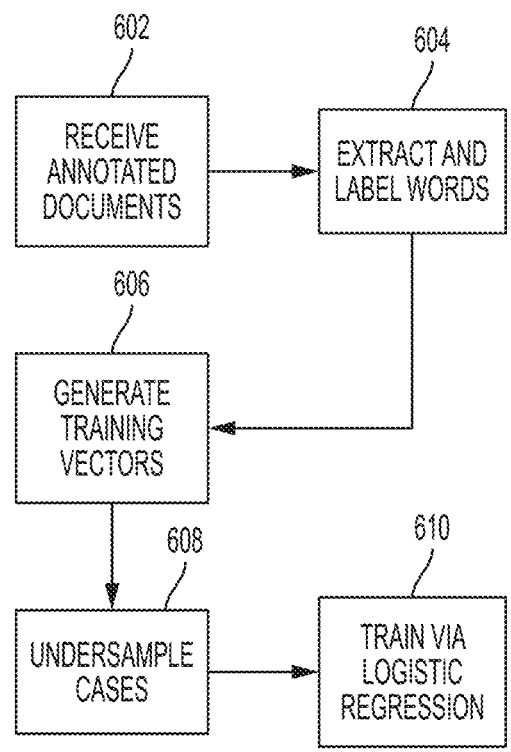
FIG. 6 illustrates an exemplary process for generating an event trigger word machine learning classifier according to examples of the disclosure.

FIG. 6 illustrates an exemplary process for generating an event trigger word machine learning classifier according to examples of the disclosure. At step 602, one or more annotated documents can be received by the system generating the machine learning classifier. The annotated documents can be annotated with a part-of-speech for each word in the document, a parse tree for each sentence in the document, and all event trigger words marked as described above. Once the annotated documents have been received, the process can move to step 604 wherein the document is parsed and event trigger words are extracted. For each word located in the annotated document that has been annotated with a part-of-speech as a noun or verb in the training document, the process can generate a training vector and label a word based on whether it is an event trigger or not an event trigger.

Once the words in the annotated documents have been extracted and labeled, the process can move to step 606 wherein training vectors can be created from each extracted word.

Training vectors can be created for each word extracted at step 606 using the context in which they appear in the documents. Each training vector can include one or more features that can be associated with each label that was established earlier. In one or more examples, a training vector for a word can include: (1) all words that appear three to the left of the extracted word, (2) all words that appear three to the right of the extracted word, (3) the stem of the word, (4) the part-of-speech of extracted word, (5) the pair of words consisting of the extracted word and the word to the left, (6) the pair of words consisting of the extracted word and the word to the right, (7) the grandparent in the parse tree of the extracted word, (8) the path from the great grandparent of extracted word to the root of the parse tree, and (9) the leftmost and rightmost leaves of the grandparent of the extracted word in the parse tree. Once each training vector has been generated at step 606, the process can move to step 608 wherein undersampling can be applied to the generated training vectors.

To mitigate imbalance (as there are many more non-event trigger words than event trigger words), undersampling can be applied to remove all but 25% (as an example) of the training vectors that are labeled with non-event trigger words. This can produce a new smaller set of training vectors. Once the training vectors have been undersampled the process can move to step 610 wherein the machine learning classifier can be trained using the generated and remaining training vectors. At step 610, the vectors remaining at step 608 can be used to train a model using (as an example) a Bayesian Logistic Regression as expressed in (Genkin, Lewis, & Madigan; 2007) and discussed above. Cross validation across the training vectors is used to determine the optimal Laplacian hyperparameter of the set, and the method is then executed until convergence where it produces a vector of learned parameters, Beta, which can form the statistical model.

Returning to the example of FIG. 4, and specifically step 402 wherein the textual dataset can be analyzed to determine event triggers words, event triggers can be identified by running the textual dataset through a machine learning classifier (as described above) that can determine if any word within the textual dataset can be classified as an event trigger. Once the event triggers have been identified in step 402, the process can move to step 404 wherein event extents can be extracted. An "extent" can refer in some examples to a sentence in which the event trigger appears. Thus, in one example, the process of extracting event extents at step 404 can include identifying sentences in the textual dataset that contain trigger words. In one or more examples, the process of identifying event extents can be performed using pre-existing third party software that is capable of determining sentences in which the identified trigger words appear. As an example the Stanford Parser™ or jCarafe™ can be utilized to identify the sentences that have event trigger words included within them.

Also at step 404, the textual dataset can be parsed to determine time extents. In other words, the dataset can be parsed to determine sentences that have time mentions included in them. Thus at the end of step 404, there can be three categories of sentences that have been extracted: (1) Sentences that have both an event trigger and a time mention; (2) a sentence that has an event trigger, but no explicit time mention; (3) a sentence that has a time mention but not event trigger; and (4) a sentence that has neither a time mention nor an event trigger. Sentences that satisfy category (4), i.e., sentences that have neither an event nor time mention can, in some examples, be discarded from further analysis.

Once the extents have been extracted at step 404, the process can move to step 406 wherein it is determined whether an extracted extent includes an event trigger word within it. Recall that at the end of step 404, an extracted sentence will either have an event trigger, a time mention, or both. At step 406, sentences that that have event triggers can be separated from sentences that don't have event triggers. If a sentence does not have an event trigger but does contain a time mention, the process can move to step 408 where it can be dealt with using one of two approaches: (1) a recall biased approach, and (2) a precision bias approach.

In a recall biased approach, the machine learning classifier can assume that there is an implicit event contained within the extent and establish an unspecified relationship to the implicit event. In a precision biased approach, it can be assumed that there is not a relevant event in the sentence since no trigger word was found, and no relationship between an event and a time mention can be established.

Returning back to step 406, if an extracted sentence contains an event trigger (the sentence may or may not have an explicit time mention), the process can move to step 412 wherein a timestamp can be established between an event and a document creation time. The process of establishing a timestamp between an event trigger and a document creation time can utilize a model created by the process described in FIG. 5 with respect to creating models using a supervised learning method of training a machine learning classifier in a machine learning paradigm.

Figure 7:
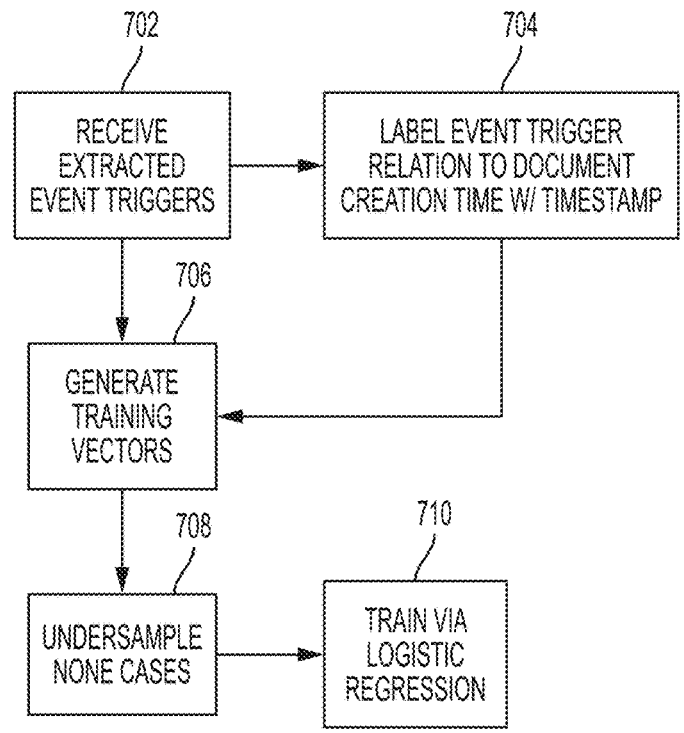
FIG. 7 illustrates an exemplary process for training a machine learning classifier to establish a time timestamp between an event trigger word and a document creation time according to one or more examples of the disclosure.

FIG. 7 illustrates an exemplary process for training a machine learning classifier to establish a time timestamp between an event trigger word and a document creation time according to one or more examples of the disclosure. The process can start at step 702, wherein the event trigger words extracted at step 604 of FIG. 6 can be received. Once the event trigger words have been received, the process can move to step 704 wherein annotated labels in the training documents can be applied to the relationship between the extracted words and the document creation time out of the following categories (as an example): 1. BEFORE (event word occurs before the time), 2. AFTER (event word occurs after the time), 3. OVERLAP (event word occurs in a period that overlaps the time) and 4. NONE (there is no temporal relationship).

Once each extracted event trigger word has been categorized according to its relationship to the document creation time, the process can move to step 706 wherein training vectors can be created for each extracted word using the context in which they appear in the documents. The training vector can include the following features: (1) the class label for each extracted word, (2) the tense label for each extracted word, (3) the token of each extracted word, (4) the stem of each extracted word, (5) the part-of-speech of extracted word, (6) the grandparent of each extracted word in the parse tree, (7) the great-grandparent of each extracted word in the parse tree, (8) the dominating preposition of each extracted word (i.e., the preposition of the prepositional phrase of each extracted word is in if it is in one), and (8) the dominating verb phrase part-of-speech of each extracted word if there is one.

Once the training vectors have been generated at step 706, the process can move to step 708 wherein undersampling can applied to remove all but 30% (as an example) of the training vectors that have been labeled 'NONE' at step 704. This can produce a new smaller set of training vectors. These vectors can then be used to train a model at step 710 using Bayesian Logistic Regression as provided in MALLET software. Cross validation across the training vectors can be used to determine the optimal Laplacian hyperparameter of the set, and the method can then be executed until convergence where it can produce a vector of learned parameters, Beta, which form the statistical model.

Returning to the example of FIG. 4, once each sentence extracted at step 404 has a timestamp relationship established between an event trigger and a document creation time, at step 412, the process can move to step 414, wherein each extent can have a timestamp between the event trigger and the time mention established. The process of establishing a timestamp between an event trigger and a time mention can utilize a model created by the process described in FIG. 5 with respect to creating models using a supervised learning method of training a machine learning classifier in a machine learning paradigm.

Figure 8:
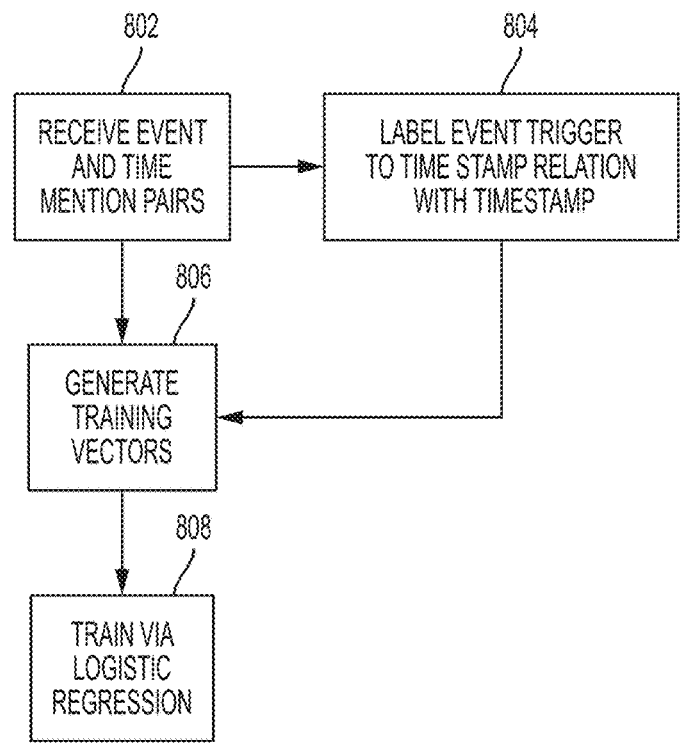
FIG. 8 illustrates an exemplary process for training a machine learning classifier to establish a time timestamp between an event trigger word and a time mention according to one or more examples of the disclosure.

FIG. 8 illustrates an exemplary process for training a machine learning classifier to establish a time timestamp between an event trigger word and a time mention according to one or more examples of the disclosure. The process can start at step 802, wherein the event trigger words extracted at step 604 of FIG. 6 can be received. Furthermore, at step 802 extracted time mentions from the annotated documents can be received as well. The time mentions can be extracted from the annotated documents using external software and the methods described above. At step 802, the extracted event trigger words can be paired with each received extracted time mention.

Once the extracted event trigger words and the extracted time mentions have been received and paired at step 802, the process can move to step 804 wherein training labels can be applied given the relationship between extracted event triggers and the document creation time out of the following categories: 1. BEFORE (event word occurs before the time), 2. AFTER (event word occurs after the time), 3. OVERLAP (event word occurs in a period that overlaps the time) and 4. NONE (there is no temporal relationship).

Once the training labels have been applied at step 804, the process can move to step 806 wherein training vectors can be created for each extracted word and time mention pair using the context in which they appear in the annotated documents. In one or more examples, a training vector for an extracted event trigger word can include: (1) all the features described in FIG. 7 step 706 for the relationship between extracted event trigger words and document creation times, (2) for each token in the time mention, the same features described in step 706 except class and tense labels, (3) the concatenation of the dominating preposition of the trigger (if one exists), (4) the dominating preposition of each token in the time mention if one exists, (5) true/false if the trigger is to the left of the time mention, (6) true/false if the part-of-speech of the trigger matches one of the part-of-speeches in the time mention, (7) the verbs that appear among the tokens 5 to the right of the extracted event trigger, (8) the prepositions that appear among the tokens 5 to the right of extracted event trigger, and (9) the number of other events or time expressions between the extracted trigger word and its time mention pair.

Once the training vectors have been generated at step 806, the process can move to step 808 wherein the training vectors can be used to train a statistical model which can be used to classify word in new data. In one or more examples, the training vectors can be used to train a model using Bayesian Logistic Regression as provided in MALLET software including the Laplace hyperparameter can be chosen from the set $\{sqrt(10)^{((i-4))}: i=0,1,2,3,4,5,6)\}$. Cross validation across the training vectors can be used to determine the optimal Laplacian hyperparameter of the set, and the method can be then executed until convergence where it produces a vector of learned parameters, Beta, which form a statistical model.

Once step 414 has been completed, the process can terminate at step 416. At the completion of step 416, each sentence in the textual dataset will either have been discarded, had an unspecified relationship between an event and a time mention associated with it, had a timestamp relationship established between the event trigger in the sentence and the time mention in the sentence and/or had a timestamp relationship established between the event trigger and the document creation time.

Returning to the example of FIG. 3 once each event and time mentions have been anchored to the timeline at step 306 (according to the process outlined in FIG. 4), the process 300 can move to step 308, wherein the timestamp relationships between a time mention in an extent and an event trigger can be written to the output file generated at step 308. As previously discussed above, the output file generated at step 308 can have the extracted time mentions extracted at step 304 already written to them. The output file generated at 308 can also have the timestamp relationship determined at step 306 written to it as well. Thus at step 308, an output file can be generated that represents events, extents, time mentions, and timestamp relationships. As previously discussed above, in one example, the output file generated in step 308 can be written into a JSON file.

Once the file has been generated at step 308, the process can move to step 310 wherein a timeline that contains all of the time mentions in a textual dataset and the events associated with the time mentions can be visualized and presented to a user (i.e., an analyst) via a display.

Figure 9:
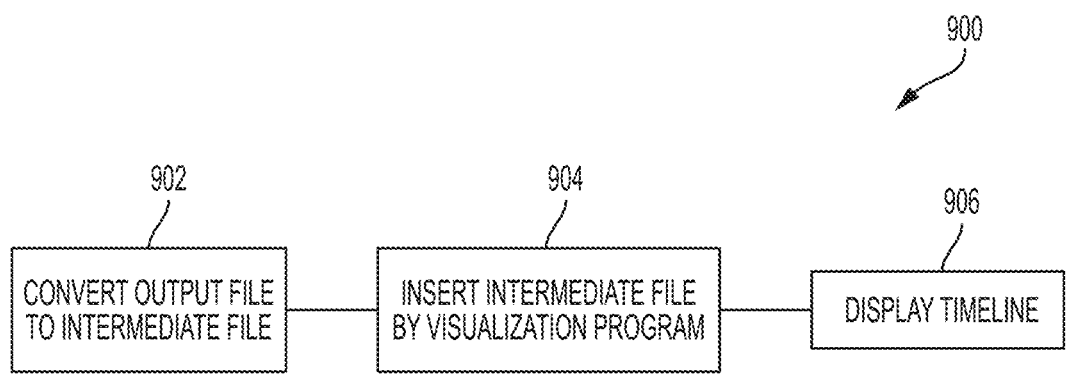
FIG. 9 illustrates an exemplary timeline visualization process according to examples of the disclosure.

FIG. 9 illustrates an exemplary timeline visualization process according to examples of the disclosure. The method 900 of FIG. 9 can begin by converting the output file generated at step 308 in the example of FIG. 3 into an intermediate representation that can be ingested by a timeline visualization software. In one example, the output file can be converted into a tabular file format (i.e., a spreadsheet). As an example, the output file can be generated into a Comma Separated Values (CSV) file.

In one or more examples, the process of converting an output file into an intermediate file such as a CSV file can include converting the output file into individual rows with a mapping (described in detail below) provided for each column of the spreadsheet.

One column can be dedicated to time. If an event has a before and after timestamp to a time, the latest before time can be selected and the earliest after time can be selected. If the before time is after the after time (meaning the event is between them) the after timestamp's time can be labeled with a start date column and the before timestamp's time can be labeled as the end date column.

If there are multiple timestamps for each timestamp, then each timestamp's time can be inserted into a start date and end date column. Otherwise (i.e., an event has one timestamp relationship) the timestamp's time can be added to the start date and end date column. In one or more examples an event trigger can be added to a column labeled event title. Finally, all of the timestamps associated with an event can be placed into the spreadsheet representation as well. As an example, if an event has a before and after timestamp to a time, the timestamp can be labeled using a color such as purple. Otherwise (i.e., the event only has one timestamp relationship) the timestamp can be labeled as blue indicating that the event has occurred before the time mentioned in the time column, red if the timestamp occurs after the time mentioned in the time column, black if the timestamp overlaps with the time mentioned in the time column, or gray if there is an unspecified relationship between the even and the time mentioned in the time column.

A similar procedure can be employed for timestamps related to the document creation time. If the time in the time column is on or before the document creation time, then a column can be indicated as having a "past" value. If the time is after the document creation time then a column can be indicated as having a "future" value.

Once the intermediate file has been generated, the method 900 can move to step 904 wherein the intermediate file can be ingested by a third-party visualization program (such as Aeon Timeline™) that can prepare a timeline visualization of the data collected in output file generated at step 308 in the example of FIG. 3 and converted to an intermediate representation at step 902 in the example of FIG. 9. Finally, at step 906 the timeline generated at step 904 can be displayed to a user.

Figure 10:
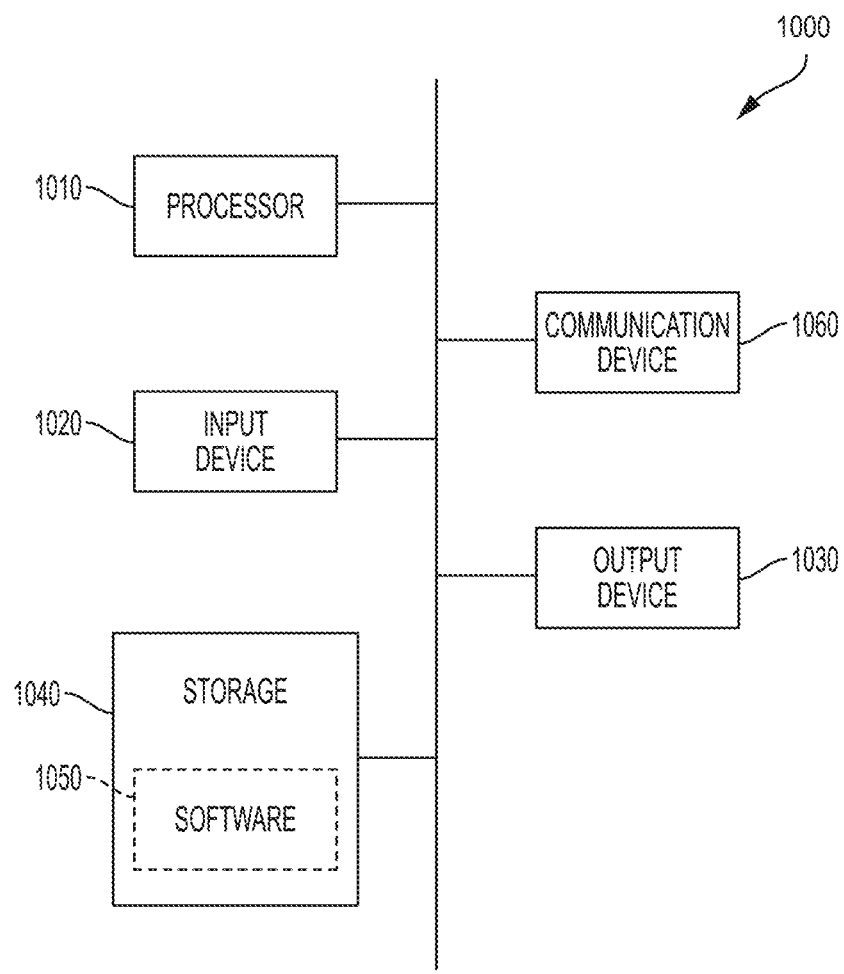
FIG. 10 illustrates an example of a computing device in accordance with one embodiment.

FIG. 10 illustrates an example of a computing device in accordance with one embodiment. Device 1000 can be a host computer connected to a network. Device 1000 can be a client computer or a server. As shown in FIG. 10, device 1000 can be any suitable type of microprocessor-based device, such as a personal computer, workstation, server or handheld computing device (portable electronic device) such as a phone or tablet. The device can include, for example, one or more of processor 1010, input device 1020, output device 1030, storage 1040, and communication device 1060. Input device 1020 and output device 1030 can generally correspond to those described above, and can either be connectable or integrated with the computer.

Input device 1020 can be any suitable device that provides input, such as a touch screen, keyboard or keypad, mouse, or voice-recognition device. Output device 1030 can be any suitable device that provides output, such as a touch screen, haptics device, or speaker.

Storage 1040 can be any suitable device that provides storage, such as an electrical, magnetic or optical memory including a RAM, cache, hard drive, or removable storage disk. Communication device 1060 can include any suitable device capable of transmitting and receiving signals over a network, such as a network interface chip or device. The components of the computer can be connected in any suitable manner, such as via a physical bus or wirelessly.

Software 1050, which can be stored in storage 1040 and executed by processor 1010, can include, for example, the programming that embodies the functionality of the present disclosure (e.g., as embodied in the devices as described above).

Software 1050 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 1040, that can contain or store programming for use by or in connection with an instruction execution system, apparatus, or device.

Software 1050 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate or transport programming for use by or in connection with an instruction execution system, apparatus, or device. The transport readable medium can include, but is not limited to, an electronic, magnetic, optical, electromagnetic or infrared wired or wireless propagation medium.

Device 1000 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Device 1000 can implement any operating system suitable for operating on the network. Software 1050 can be written in any suitable programming language, such as C, C++, Java or Python. In various embodiments, application software embodying the functionality of the present disclosure can be deployed in different configurations, such as in a client/server arrangement or through a Web browser as a Web-based application or Web service, for example.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

This application discloses several numerical ranges in the text and figures. The numerical ranges disclosed inherently support any range or value within the disclosed numerical ranges, including the endpoints, even though a precise range limitation is not stated verbatim in the specification because this disclosure can be practiced throughout the disclosed numerical ranges.

The above description is presented to enable a person skilled in the art to make and use the disclosure, and is provided in the context of a particular application and its requirements. Various modifications to the preferred embodiments will be readily apparent to those skilled in the art, and the generic principles defined herein may be applied to other embodiments and applications without departing from the spirit and scope of the disclosure. Thus, this disclosure is not intended to be limited to the embodiments shown, but is to be accorded the widest scope consistent with the principles and features disclosed herein. Finally, the entire disclosure of the patents and publications referred in this application are hereby incorporated herein by reference.

What is claimed is:

1. A method for automatically generating event timelines from a textual dataset, the method comprising:
   receiving a textual dataset;
   extracting a plurality of time mentions from the textual dataset;
   extracting a plurality of event trigger words from the textual dataset;

extracting one or more document creation times from the textual dataset;

determining a relationship between each extracted event trigger word of the plurality of event trigger words from the textual dataset and an extracted time mention from the plurality of extracted time mentions from the textual dataset, wherein determining the relationship between the extracted event trigger word and the extracted time mention from the textual dataset includes training a vector-based Laplace-prior logistic regression machine learning classifier with one or more training vectors, wherein the one or more training vectors are under-sampled, and wherein the one or more training vectors are based on one or more words extracted from an annotated document- and wherein the training vectors train the classifier to categorize the relationship between the extracted event trigger word and the extracted time mentions;

determining a relationship between each extracted event trigger word of the extracted plurality of event trigger words from the textual dataset and an extracted document creation time of the one or more extracted document creation times from the textual dataset, wherein determining a relationship between the extracted event trigger words from the textual dataset and the extracted document creation time from the textual dataset includes training a vector-based machine learning classifier to categorize the relationship between the extracted event trigger word and the extracted document creation time, and wherein the relationship between the extracted event trigger words from the textual dataset and the extracted document creation time comprises: (1) event trigger words occurring before the document creation time, (2) event trigger words coming after the document creation time, (3) event trigger words overlapping the document creation time, and (4) event trigger words that have no temporal relationship with the document creation time; and generating a timeline, wherein the timeline is based on the one or more extracted event trigger words, the one or more extracted time mentions, the determined relationship between the extracted event trigger word from the textual dataset and the extracted time mention from the textual dataset, and the determined relationship between the extracted event trigger word from the textual dataset and the extracted document creation time from the textual dataset.

2. The method of claim 1, wherein extracting one or more event trigger words from the textual dataset comprises:
receiving the annotated document;
extracting one or more marked event trigger words from the annotated document; and
generating the one or more training vectors based on the received annotated document and the extracted marked one or more event trigger words from the annotated.

3. The method of claim 1, wherein generating one or more training vectors includes identifying one or more features of the annotated document: (1) words in the annotated document that appear three to the left of each extracted event trigger word, (2) words in the annotated document that appear three to the right of each extracted event trigger word, (3) the stem of each extracted event trigger word, (4) the part-of-speech of each extracted event trigger word, (5) a pair of words consisting of each extracted event trigger word and a word to the left of each extracted event trigger word in the annotated document, and (6) one or more pairs of words consisting of each extracted event trigger word and a word to the right of each extracted trigger word in the annotated document.

4. The method of claim 1, wherein training a machine learning classifier to categorize the relationship between the extracted event trigger word and the extracted time mention comprises:
receiving an annotated document;
extracting one or more marked event trigger words from the annotated document;
extracting one or more time mentions from the annotated document;
determining one or more time relationships between each marked event trigger word of the one or more extracted marked event trigger words from the annotated document and the one or more extracted time mentions from the annotated document;
generating one or more training vectors based on the received annotated the extracted marked one or more event trigger words from the annotated document and the extracted one or more time mentions from the annotated document, wherein generating one or more training vectors includes identifying one or more features of the annotated training document; and
training the machine learning classifier based on the one or more training vectors.

5. The method of claim 4, wherein training the machine learning classifier based on the one or more training vectors includes using the one or more training vectors to train a Laplace-prior logistic regression machine learning classifier.

6. The method of claim 4, wherein identifying one or more features of the annotated document includes identifying one or more of the following: (1) a class label for each extracted marked event trigger word and extracted time mention, (2) a tense label for each extracted marked event trigger word and extracted time mention, (3) a token of each extracted marked event trigger word and extracted time mention, (4) a stem of each extracted marked event trigger word and extracted time mention, and (5) a part-of-speech of each extracted marked event trigger word and extracted time mention.

7. The method of claim 4, wherein the method further comprises undersampling the one or more training vectors.

8. The method of claim 1, wherein training a machine learning classifier to categorize the relationship between the extracted event trigger word and the extracted document creation time comprises:
receiving an annotated document;
extracting one or more marked event trigger words from the received annotated document;
extracting one or more document creation times from the received annotated document;
determining one or more time relationships between each marked event trigger word of the one or more extracted marked event trigger words from the annotated document and the one or more extracted document creation times from the annotated document;
generating one or more training vectors based on the extracted one or more marked event trigger words from the annotated document and the one or more extracted time mentions from the annotated document, wherein generating one or more training vectors includes identifying one or more features of the annotated training document; and
training the machine learning classifier based on the one or more training vectors.

9. The method of claim 8, wherein training the machine learning classifier based on the one or more training vectors includes using the one or more training vectors to train a Laplace-prior logistic regression machine learning classifier.

10. The method of claim 8, wherein identifying one or more features of the annotated document includes identifying one or more of the following: (1) a class label for each extracted marked event trigger word and extracted time mention, (2) a tense label for each extracted marked event trigger word and extracted time mention, (3) a token of each extracted marked event trigger word and extracted time mention, (4) a stem of each extracted marked event trigger word and extracted time mention, and (5) a part-of-speech of each extracted marked event trigger word and extracted time mention.

11. A non-transitory computer readable storage medium having stored thereon a set of instructions for processing instructions of a software program that when executed by a computing device, cause the computing device to:
receive a textual dataset;
extract a plurality of time mentions from the textual dataset;
extract a plurality of event trigger words from the textual dataset;
extract one or more document creation times from the textual dataset;
determine a relationship between each extracted event trigger word of the plurality of event trigger words from the textual dataset and an extracted time mention from the plurality of extracted time mentions from the textual dataset, wherein determining the relationship between the extracted event trigger word and the extracted time mention from the textual dataset includes training a vector-based Laplace-prior logistic regression machine learning classifier with one or more training vectors, wherein the one or more training vectors are under-sampled, and wherein the one or more training vectors are based on one or more words extracted from an annotated document- and wherein the training vectors train the classifier to categorize the relationship between the extracted event trigger word and the extracted time mentions;
determine a relationship between each extracted event trigger word of the extracted one or more event trigger words from the textual dataset and an extracted document creation time of the one or more extracted document creation times from the textual dataset, wherein determining a relationship between the extracted event trigger words from the textual dataset and the extracted document creation time from the textual dataset includes training a vector-based machine learning classifier to categorize the relationship between the extracted event trigger word and the extracted document creation time, and wherein the relationship between the extracted event trigger words from the textual dataset and the extracted document creation time comprises: (1) event trigger words occurring before the document creation time, (2) event trigger words coming after the document creation time, (3) event trigger words overlapping the document creation time, and (4) event trigger words that have no temporal relationship with the document creation time; and
generate a timeline, wherein the timeline is based on the one or more extracted event trigger words, the one or more extracted time mentions, the determined relationship between the extracted event trigger word from the textual dataset and the extracted time mention from the textual dataset, and the determined relationship between the extracted event trigger word from the textual dataset and the extracted document creation time from the textual dataset.

12. The non-transitory computer readable storage medium of claim 11, wherein extracting one or more event trigger words from the textual dataset comprises:
receiving the annotated document;
extracting one or more marked event trigger words from the annotated document; and
generating the one or more training vectors based on the received annotated document and the extracted marked one or more event trigger words from the annotated document.

13. The non-transitory computer readable storage medium of claim 11, wherein generating one or more training vectors includes identifying one or more features of the annotated including: (1) words in the annotated document that appear three to the left of each extracted event trigger word, (2) words in the annotated document that appear three to the right of each extracted event trigger word, (3) the stem of each extracted event trigger word, (4) the part-of-speech of each extracted event trigger word, (5) a pair of words consisting of each extracted event trigger word and a word to the left of each extracted event trigger word in the annotated document, and (6) one or more pairs of words consisting of each extracted event trigger word and a word to the right of each extracted trigger word in the annotated document.

14. The non-transitory computer readable storage medium of claim 11, wherein training a machine learning classifier to categorize the relationship between the extracted event trigger word and the extracted time mention comprises:
receiving an annotated document;
extracting one or more marked event trigger words from the annotated document;
extracting one or more time mentions from the annotated document;
determining one or more time relationships between each marked event trigger word of the one or more extracted marked event trigger words from the annotated document and the one or more extracted time mentions from the annotated document;
generating one or more training vectors based on the received annotated the extracted marked one or more event trigger words from the annotated document and the extracted one or more time mentions from the annotated document, wherein generating one or more training vectors includes identifying one or more features of the annotated training document; and
training the machine learning classifier based on the one or more training vectors.

15. The non-transitory computer readable storage medium of claim 14, wherein training the machine learning classifier based on the one or more training vectors includes using the one or more training vectors to train a Laplace-prior logistic regression machine learning classifier.

16. The non-transitory computer readable storage medium of claim 14, wherein identifying one or more features of the annotated document includes identifying one or more of the following: (1) a class label for each extracted marked event trigger word and extracted time mention, (2) a tense label for each extracted marked event trigger word and extracted time mention, (3) a token of each extracted marked event trigger word and extracted time mention, (4) a stem of each extracted marked event trigger word and extracted time mention, and (5) a part-of-speech of each extracted marked event trigger word and extracted time mention.

17. The non-transitory computer readable storage medium of claim 14, wherein the device is further caused to under-sample the one or more training vectors.

18. The non-transitory computer readable storage medium of claim 11, wherein training a machine learning classifier to categorize the relationship between each extracted event trigger word and the one or more extracted document creation times comprises:
   receiving an annotated document;
   extracting one or more marked event trigger words from the received annotated document;
   extracting one or more document creation times from the received annotated document;
   determining one or more time relationships between each marked event trigger word of the one or more extracted marked event trigger words from the annotated document and the one or more extracted document creation times from the annotated document;
   generating one or more training vectors based on the extracted one or more marked event trigger words from the annotated document and the one or more extracted time mentions from the annotated document, wherein generating one or more training vectors includes identifying one or more features of the annotated training document; and
   training the machine learning classifier based on the one or more training vectors.

19. The non-transitory computer readable storage medium of claim 18, wherein training the machine learning classifier based on the one or more training vectors includes using the one or more training vectors to train a Laplace-prior logistic regression machine learning classifier.

20. The non-transitory computer readable storage medium of claim 18, wherein identifying one or more features of the annotated document includes identifying one or more of the following: (1) a class label for each extracted marked event trigger word and extracted time mention, (2) a tense label for each extracted marked event trigger word and extracted time mention, (3) a token of each extracted marked event trigger word and extracted time mention, (4) a stem of each extracted marked event trigger word and extracted time mention, and (5) a part-of-speech of each extracted marked event trigger word and extracted time mention.

21. An electronic device, the device comprising:
   a memory; and
   one or processors configured to:
      receive a textual dataset;
      extract a plurality of time mentions from the textual dataset;
      extract a plurality of event trigger words from the textual dataset;
      extract one or more document creation times from the textual dataset;
      determine a relationship between each extracted event trigger word of the plurality of event trigger words from the textual dataset and an extracted time mention from the plurality of extracted time mentions from the textual dataset, wherein determining the relationship between the extracted event trigger word and the extracted time mention from the textual dataset includes training a vector-based Laplace-prior logistic regression machine learning classifier with one or more training vectors, wherein the one or more training vectors are under-sampled, and wherein the one or more training vectors are based on one or more words extracted from an annotated document- and wherein the training vectors train the classifier to categorize the relationship between the extracted event trigger word and the extracted time mentions;
      determine a relationship between each extracted event trigger word of the extracted one or more event trigger words from the textual dataset and an extracted document creation time of the one or more extracted document creation times from the textual dataset, wherein determining a relationship between the extracted event trigger words from the textual dataset and the extracted document creation time from the textual dataset includes training a vector-based machine learning classifier to categorize the relationship between the extracted event trigger word and the extracted document creation time, and wherein the relationship between the extracted event trigger words from the textual dataset and the extracted document creation time comprises: (1) event trigger words occurring before the document creation time, (2) event trigger words coming after the document creation time, (3) event trigger words overlapping the document creation time, and (4) event trigger words that have no temporal relationship with the document creation time; and
      generate a timeline, wherein the timeline is based on the one or more extracted event trigger words, the one or more extracted time mentions, the determined relationship between the extracted event trigger word from the textual dataset and the extracted time mention from the textual dataset, and the determined relationship between the extracted event trigger word from the textual dataset and the extracted document creation time from the textual dataset.

22. The device of claim 21, wherein extracting one or more event trigger words from the textual dataset comprises:
   receiving the annotated document;
   extracting one or more marked event trigger words from the annotated document; and
   generating the one or more training vectors based on the received annotated document and the extracted marked one or more event trigger words from the annotated document.

23. The device of claim 21, wherein generating one or more training vectors includes identifying one or more features of the annotated document including: (1) words in the annotated document that appear three to the left of each extracted event trigger word, (2) words in the annotated document that appear three to the right of each extracted event trigger word, (3) the stem of each extracted event trigger word, (4) the part-of-speech of each extracted event trigger word, (5) a pair of words consisting of each extracted event trigger word and a word to the left of each extracted event trigger word in the annotated document, and (6) one or more pairs of words consisting of each extracted event trigger word and a word to the right of each extracted trigger word in the annotated document.

24. The device of claim 21, wherein training a machine learning classifier to categorize the relationship between the extracted event trigger word and the extracted time mention comprises:
   receiving an annotated document;
   extracting one or more marked event trigger words from the annotated document;
   extracting one or more time mentions from the annotated document;

determining one or more time relationships between each marked event trigger word of the one or more extracted marked event trigger words from the annotated document and the one or more extracted time mentions from the annotated document;

generating one or more training vectors based on the received annotated the extracted marked one or more event trigger words from the annotated document and the extracted one or more time mentions from the annotated document, wherein generating one or more training vectors includes identifying one or more features of the annotated training document; and training the machine learning classifier based on the one or more training vectors.

25. The device of claim 24, wherein training the machine learning classifier based on the one or more training vectors includes using the one or more training vectors to train a Laplace-prior logistic regression machine learning classifier.

26. The device of claim 24, wherein identifying one or more features of the annotated document includes identifying one or more of the following: (1) a class label for each extracted marked event trigger word and extracted time mention, (2) a tense label for each extracted marked event trigger word and extracted time mention, (3) a token of each extracted marked event trigger word and extracted time mention, (4) a stem of each extracted marked event trigger word and extracted time mention, and (5) a part-of-speech of each extracted marked event trigger word and extracted time mention.

27. The device of claim 24, wherein the processor is further caused to undersample the one or more training vectors.

28. The device of claim 21, wherein training a machine learning classifier to categorize the relationship between each extracted event trigger word and the one or more extracted document creation times comprises:

receiving an annotated document;

extracting one or more marked event trigger words from the received annotated document;

extracting one or more document creation times from the received annotated document;

determining one or more time relationships between each marked event trigger word of the one or more extracted marked event trigger words from the annotated document and the one or more extracted document creation times from the annotated document;

generating one or more training vectors based on the extracted one or more marked event trigger words from the annotated document and the one or more extracted time mentions from the annotated document, wherein generating one or more training vectors includes identifying one or more features of the annotated training document; and training the machine learning classifier based on the one or more training vectors.

29. The device of claim 28, wherein training the machine learning classifier based on the one or more training vectors includes using the one or more training vectors to train a Laplace-prior logistic regression machine learning classifier.

30. The device of claim 28, wherein identifying one or more features of the annotated document includes identifying one or more of the following: (1) a class label for each extracted marked event trigger word and extracted time mention, (2) a tense label for each extracted marked event trigger word and extracted time mention, (3) a token of each extracted marked event trigger word and extracted time mention, (4) a stem of each extracted marked event trigger word and extracted time mention, and (5) a part-of-speech of each extracted marked event trigger word and extracted time mention.

* * * * *